R. S. TROTT.
SPRING LUBRICATING SYSTEM.
APPLICATION FILED FEB. 24, 1917.
1,289,970.
Patented Dec. 31, 1918.
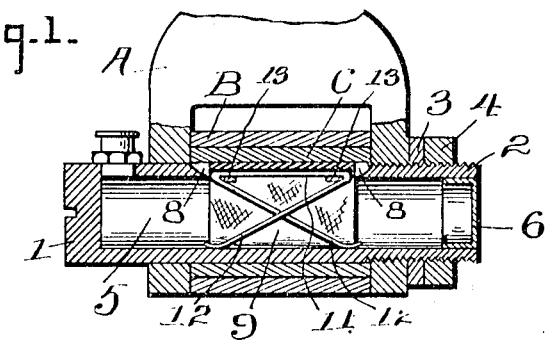
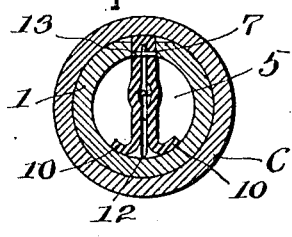
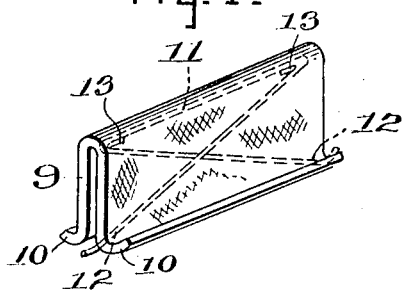
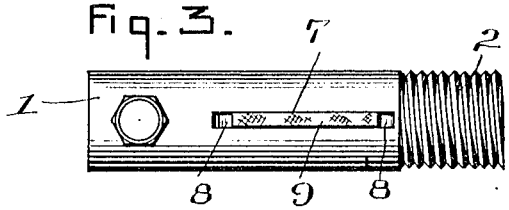
Inventor
Rolland S. Trott
By Vernon E. Hodges
his Attorney

UNITED STATES PATENT OFFICE.

ROLLAND S. TROTT, OF DETROIT, MICHIGAN.

SPRING-LUBRICATING SYSTEM.

1,289,970.

Specification of Letters Patent.

Patented Dec. 31, 1918.

Application filed February 24, 1917. Serial No. 150,719.

*To all whom it may concern:*

Be it known that I, ROLLAND S. TROTT, a citizen of the United States of America, residing at Detroit, in the county of Wayne and State of Michigan, have invented certain new and useful Improvements in Spring-Lubricating Systems, of which the following is a specification.

This invention relates to spring lubricating systems.

The object of this invention is to provide a feed for the spring bolt bearing that will continuously feed the oil by capillary action from the internal oil reservoir to the bearing surface; also to provide a wick that will not become clogged with dirt or become glazed over thereby stopping the feeding action, as may happen with a felt wick; also a wick that will not swell and in a way disintegrate when under the action of water now and then as felt wicks sometimes do.

Another object is to provide positive means to maintain the wick in contact with the bearing surface, thus insuring a constant pressure of the wick against the surface to be lubricated instead of simply cutting the wick a bit long and relying on its own expansive pressure to maintain contact with the bearing. This is done with felt wicks and a slight variation in the wick lengthwise may spoil the oil feeding effect; so that if wicks of wrong lengths or if wicks of right lengths later become worn or get sheared off by taking the bolts out repeatedly, very imperfect action is obtained.

Figure 1 is a sectional view illustrating one form of use of my device;

Fig. 2 is a transverse section;

Fig. 3 is an enlarged detail view of the reservoir proper; and

Fig. 4 is a perspective view of my wick and support assembled.

As shown in Fig. 1 the spring bolt 1 is adapted to be received within the yoke A, the ears of which yoke are adapted to surround the spring eye B and spring eye bushing C. The said spring bolt 1 is adapted to pass through said ears and spring eye bushing. The spring bolt 1 is cylindrical in shape, and the head of the bolt is adapted to fit closely in the side of the yoke while the threaded end 2 of the bolt is screwed into the other threaded side of the yoke, and a lock washer 3 and nut 4 received upon the end of the bolt outside of the yoke are adapted to lock the bolt in position and hold it there. This is one of many possible forms.

The spring bolt is provided with a central bore 5 which is adapted to extend practically the full length thereof, and is closed at one end by a screw or drive plug 6.

There are various ways of forming the receptacle within the bolt 5, and I do not wish to be limited to any specific form.

To feed the oil from the reservoir to the bearing, I provide the spring bolt with an elongated slot 7 which is preferably, although not necessarily, formed in the bolt by a milling cutter thereby leaving a portion of the slot 7 open as at 8—8 at each end.

These openings 8—8 may be done away with by drilling a hole at each end of the intended slot and removing the metal between them, thus leaving the ends of the slot 7 rounded, but going straight down into the oil reservoir, and leave no openings 8—8 at the ends of the wick.

A wick 9 of the proper material is cut at the proper width to be conveniently received within the elongated slot 7 and of such a length as to be folded over upon itself and to allow the ends 10—10 to turn up, thus insuring the soaking up of the very last of the oil in the reservoir, furthermore making a slight variation in cutting the wick lengths of no importance.

In order to hold the wick in contact with the bearing surface, a spring steel wire 11 is used. This wire is at first of substantially U-shaped form and the outer ends 12—12 are then bent inwardly and are crossed, as clearly shown in Figs. 1 and 4.

In the construction shown the horizontal portion of the wire is adapted to be received within curved portion of the wick, and to press the same constantly against the inner surface of the bushing C, thereby insuring at all times sufficient contact between the two to insure lubrication.

Heretofore, it has been the common practice to use felt for wicks in spring bolts. In felt the capillary channels are intermittent or rather a series of connected interstices. For this reason dirt plugs them quite quickly and impairs the capillary action. Another form of this dirt clogging is the glazing mentioned. Both of these stop the oil feed from the felt wicking. Also because of the structure of felt, its absence of long fibers which would act as binders, the felt (or at least some felt) will swell and disintegrate under action of water, though this may possibly be due to lime or acid or other substance carried in with the water; but in any event the result is detrimental and spoils the wick as an efficient means of oil feed. By the use of ordinary cotton lamp wicking, which I have adopted, these difficulties are overcome.

As shown in Fig. 2 the bolt 1 may be flattened on its periphery adjacent to its elongated slot 7, thereby providing efficient means to feed oil to both sides of the bolt and prevent fibers of the wick catching between the bearing and edge of the slot 7.

The spring 11 may be either sewed or riveted in place as shown at 13. It is obvious that other methods of forming this spring may be employed to accomplish the results, therefore, I do not desire to be confined to the specific construction disclosed herein, but—

I claim:

1. A lubricant feed consisting of a wick folded over upon itself and a resilient supporting means interposed between said folded wick.

2. A lubricated bearing consisting of a bolt provided with a central oil reservoir, and an oil feeding means leading therefrom to the outer circumference thereof, consisting of a spring-held wick.

3. A lubricated bearing consisting of a bolt provided with a central oil reservoir, an opening leading from the reservoir to the outer circumference thereof, a wick inserted therein, and means for supporting the wick and causing it to protrude through said opening.

4. A lubricated bearing consisting of a bolt provided with a central oil reservoir, an opening leading from the reservoir to the circumference thereof, a wick which is adapted to be folded and inserted within said opening and means confined within said wick for supporting it and causing it to protrude through said opening.

5. A lubricated bearing consisting of a bolt provided with a central oil reservoir, an elongated slot formed in the wall thereof, a bearing surrounding said bolt, a wick which is adapted to be folded and inserted within said opening, a spring confined within said wick and secured thereto which is adapted to support and cause the wick to bear against the inner circumference of the bearing.

In testimony whereof I affix my signature.

ROLLAND S. TROTT.

Copies of this patent may be obtained for five cents each, by addressing the "Commissioner of Patents, Washington, D. C."